United States Patent Office 3,098,814
Patented July 23, 1963

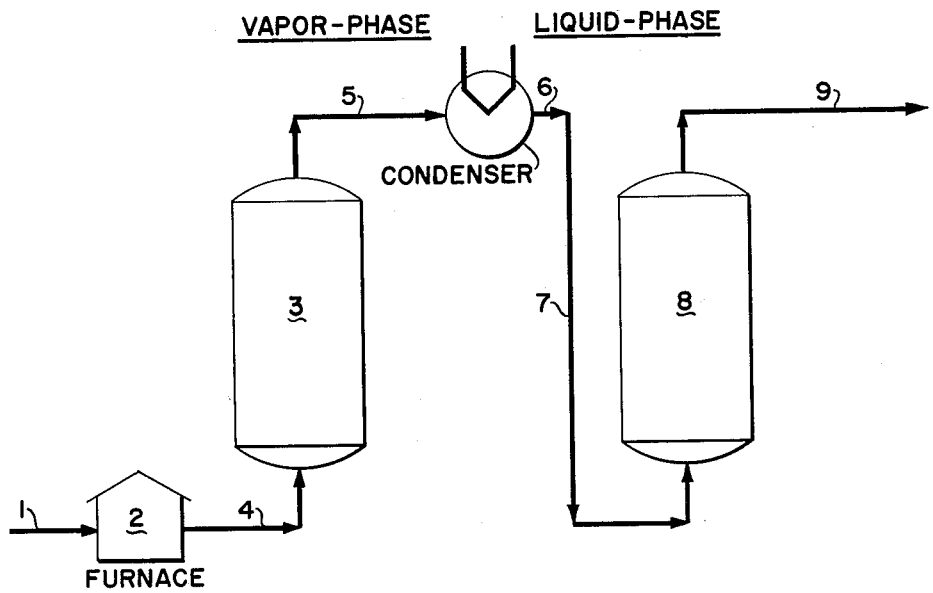
TWO-PHASE LIQUID-VAPOR ADSORPTION
Fig. I
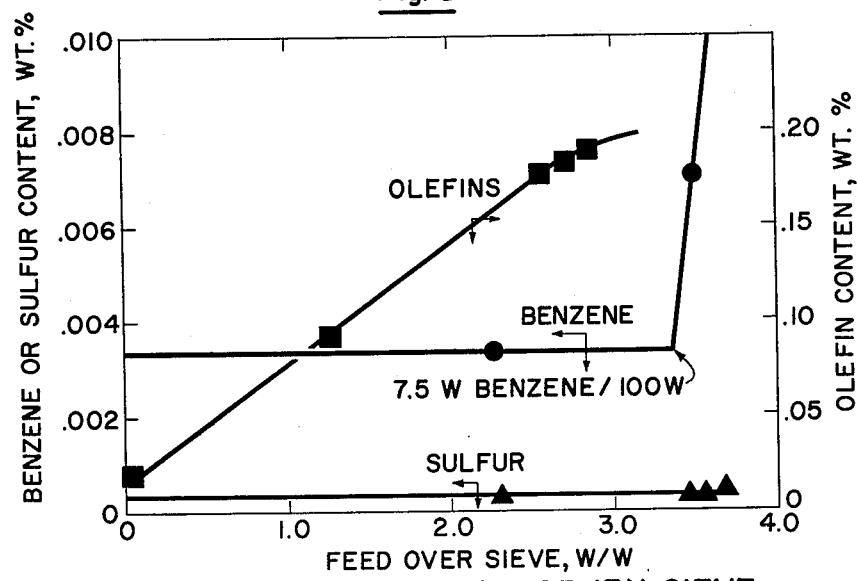
ONE-STAGE VAPOR PHASE 13X SIEVE
Fig. II

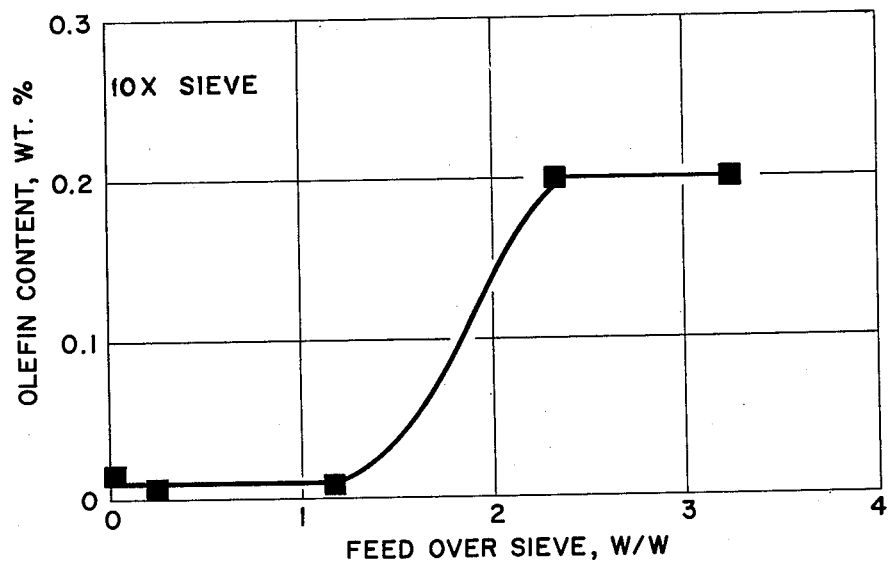
ONE-STAGE VAPOR PHASE 10X SIEVE
Fig. III
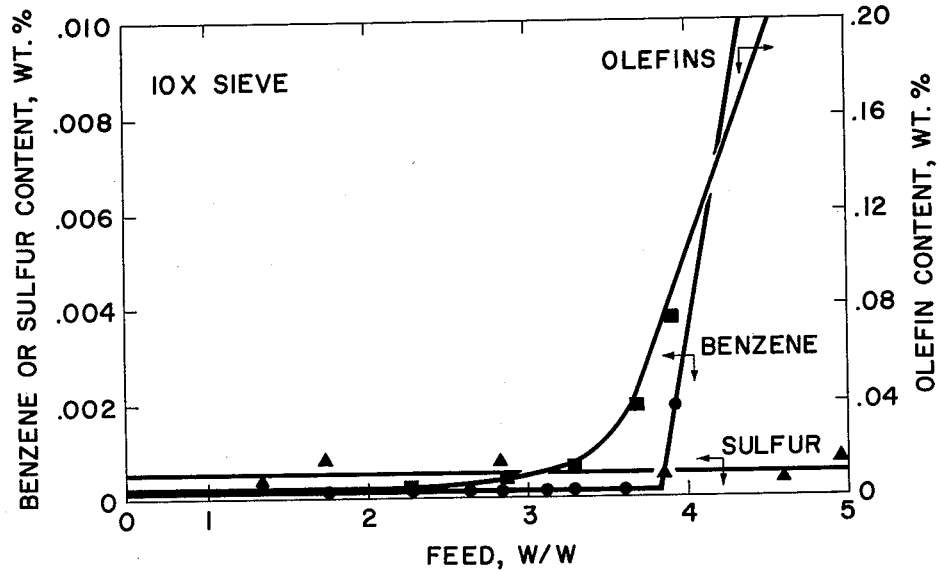
ONE-STAGE LIQUID PHASE 10X SIEVE
Fig. IV
William R. Epperly    Inventor
By _Richard J. H. Nagel_    Patent Attorney July 23, 1963 W. R. EPPERLY 3,098,814
TWO-STAGE ADSORPTION PROCESS
Filed Sept. 8, 1959 3 Sheets-Sheet 3
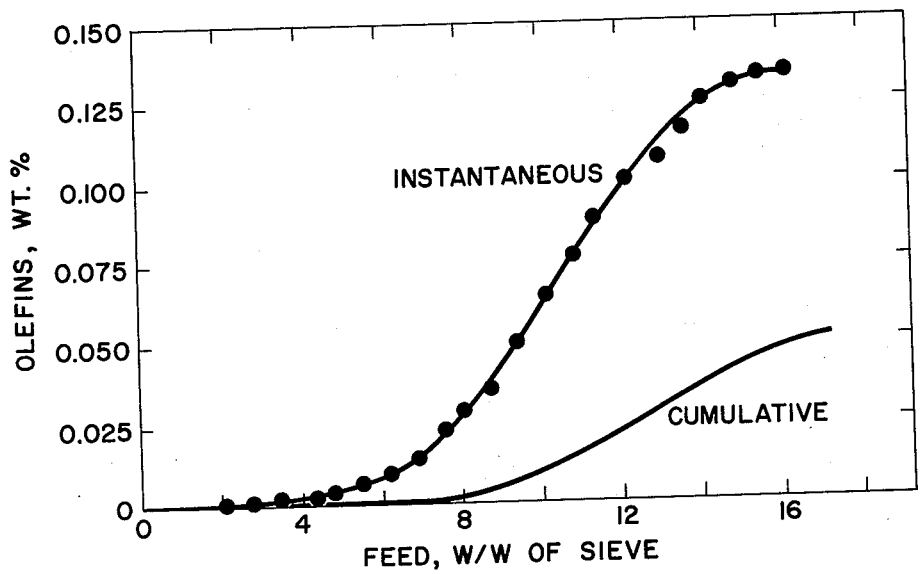
SECOND-STAGE VAPOR-LIQUID 10X SIEVE
Fig. V
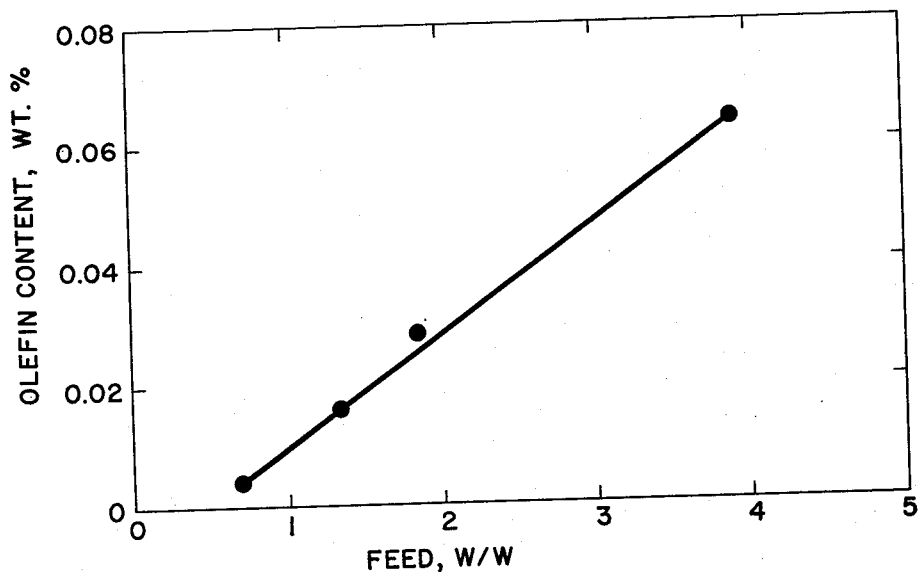
SECOND-STAGE VAPOR-LIQUID 13X SIEVE
Fig. VI
William R. Epperly    Inventor
By *Richard W. Nagel*    Patent Attorney

3,098,814
TWO-STAGE ADSORPTION PROCESS
William R. Epperly, Roselle, N.J., assignor to Esso Research and Engineering Company, a corporation of Delaware
Filed Sept. 8, 1959, Ser. No. 838,642
10 Claims. (Cl. 208—91)

The present invention relates to the preparation of feed for isomerization and paraffin alkylation. More particularly, it relates to a new and useful process for removing from the feed certain hydrocarbons which are detrimental to the catalyst used in isomerization and paraffin alkylation. Even more particularly, the invention relates to the removal of olefins, aromatics and sulfur compounds from the feed stream with a molecular sieve.

With the modern trend to the use of higher compression ratios in automotive engines there has been an increasing demand for motor fuels of higher octane rating. One of the processes employed for improving the octane quality of naphthas that are blended into gasoline involves subjection of a fraction comprising normal paraffin hydrocarbons to a catalytic isomerization reaction wherein conversion to branched chain hydrocarbons takes place. The isomerization of normal paraffins to isoparaffins in the presence of a Friedel-Crafts type catalyst, of which aluminum bromide is an example, and in the presence of promotional amounts of halogen-containing promoters, of which hydrogen chloride is a typical example, is old. Numerous processes have been devised, both vapor phase and liquid phase, for the isomerization of normal paraffins to the corresponding isoparaffins.

When the light naphtha being isomerized contains appreciable amounts of benzene, olefins and/or sulfur, the efficiency of the isomerization reaction is seriously impaired. The presence of benzene in the feed to the isomerization reaction in quantities greater than about 0.02 volume percent is injurious when the highly active aluminum bromide catalyst is employed. To ensure that the isomerization reaction will not be retarded, it is necessary to remove these aromatic and olefinic hydrocarbons and sulfur or substantially reduce their concentration in the feed stream. In addition, the presence of benzene interferes with the separation of heavy naphthenic bottoms by fractionation. This may_be a desirable step in preparing the light naphtha as an isomerization feed. The benzene, which has a normal boiling point of 176° F., forms low boiling azeotropes with normal hexane and naphthenes such as methyl cyclopentane and cyclohexane. Efficient separation of the naphthenes and benzene from the paraffinic compounds is impossible because of the azeotropes which tend to come overhead with the desirable paraffinic compounds. These azeotropes boil in the same range as does normal hexane in a light naphtha cut, i.e. 150 to 160° F. Once the benzene is removed, this separation becomes simple. The separation of aromatics can be done by such methods as solvent extraction, extractive distillation, and low pressure hydrogenation using a catalyst such as palladium. Operations of this type are costly, however, and the need for better methods for removing aromatics has continued to exist.

Recent studies show that isomerization processes using aluminum bromide catalysts are extremely sensitive to olefins. $C_5/C_6$ olefins may alkylate with isobutane to form $C_9$ and $C_{10}$ paraffins. These heavy paraffins react with the catalyst to form sludge which consumes the costly aluminum bromide catalyst. Furthermore, the sludge fouls and deactivates the catalyst support and is highly corrosive.

Known natural adsorbents, such as silica gel, have proven ineffective for preparing feed for isomerization. This is because their selectivity for aromatics, olefins and sulfur is not as great as the synthetic sieves.

The use of molecular sieves having uniform pore size ranging from 6 to 15 angstrom units for removing certain impurities from hydrocarbon feed streams is old. It has been suggested in the prior art that aromatics, olefins and sulfur individually may be removed.

In aluminum bromide isomerization, more extensive studies show that in addition to aromatics and sulfur substantially all of the olefins must be removed, i.e. all but 0.01%, which can be tolerated.

It has been hitherto suggested that imprities may be removed from hydrocarbons by adsorbing them on sieves either in the vapor or the liquid phase. Such procedures, however, have not proven satisfactory for obtaining good, economical removal of aromatics, sulfur and olefins, particularly when these are present at the same time. Under conditions wherein the harmful aromatics and sulfur compounds are substantially completely removed, olefin concentration in the exit stream is either above the required target level or the capacity of the sieve is so low as to require an uneconomically high desorption frequency.

In accordance with this invention it has been found that by using a specific two-stage adsorption process wherein a vapor-phase adsorption is followed by a liquid-phase adsorption, it is possible to reduce olefin concentration to less than 0.01% and to satisfactorily remove aromatics and sulfur from a hydrocarbon stream.

The instant invention has many advantages over the prior processes. Thus, when only vapor phase operation is used, the olefin adsorption and sieve capacity is insufficient. This is clearly shown by the data in the examples. On the other hand, liquid phase adsorption alone, while somewhat more effective than vapor phase for olefin removal, still does not have the requisite capacity. Furthermore, such operation is complicated and costly because of the necessity of draining the sieve case prior to vapor phase desorption. In addition, the high temperature difference between liquid phase adsorption and vapor phase desorption makes cooling and heating rates more critical. It is therefore highly desirable, when liquid phase operation must be used, to minimize the frequency of desorption, i.e. the switching back and forth from the vapor to liquid phase and from liquid to vapor phase, etc.

In this invention, by removing the benzene and sulfur in the initial vapor-phase operation, it has been found that desorption frequency in a subsequent liquid phase adsorption is much lower; and furthermore, improved olefin adsorption is obtained.

The initial vapor-phase operation is rather simple because both adsorption and desorption are in the vapor phase. Olefins are then removed at a lower temperature in a second liquid-phase stage. By removing benzene and sulfur in the initial vapor stage, the amount of feed processed in the liquid stage is doubled. This is clearly brought out in the examples below. Doubling the liquid-phase stage capacity, of course, effectively halves the frequency of desorption. Also, this invention takes full advantage of the greatly improved olefin capacity of lower temperature, liquid-phase, vis-a-vis vapor-phase, operation.

Furthermore, an additional advantage to the two-stage operation of this invention is that different desorption conditions can be selected for the two stages. Since olefins do not require extreme desorption conditions because of their lower tenacity for the molecular sieve adsorbent, the second stage can be desorbed at a relatively low temperature. The lower temperature desorption of olefins minimizes wasteful olefin polymerization on the sieve. If one stage were used to remove all three components in addition to obtaining poor olefin desorption, the high temperature required for benzene and sulfur desorption would result in excessive olefin polymerization.

FIGURE I is a flow chart of the preferred process of this invention.

FIGURE II is a graph showing the content of benzene, sulfur and olefins in the effluent feed from a vapor-phase adsorption using a 13X molecular sieve plotted against the amounts of feed over the sieve.

FIGURE III shows graphically the olefin content in the effluent from a vapor phase operation with a 10X sieve plotted against the amount of feed over the sieve.

FIGURE IV graphs a liquid-phase adsorption using a 10X sieve. The benzene, sulfur and olefin content in the effluent vs. the feed over the sieve is shown.

FIGURE V shows the cumulative and instantaneous olefin concentration of the effluent from the second stage of the two-stage process taught by this invention vs. the feed weight over sieve weight.

FIGURE VI shows the effluent from the second stage liquid-phase adsorption of the two-stage process of this invention using a 13X sieve plotted against the weight of feed per weight of sieve.

FIGURE I illustrates the two-phase vapor liquid adsorption. Hydrocarbon feed containing olefins, aromatics and sulfur is introduced through line 1 into furnace 2 wherein it is vaporized and preheated to a temperature between 150° to 500° F., preferably to 200° to 350° F. This preheated feed enters contacting zone 3 through line 4 and is stripped of substantially all aromatics and sulfur. Contacting zone 3 contains preferably a 13X or 10X molecular sieve. Some olefins are also adsorbed in this stage. The aromatic, sulfur-free hydrocarbon leaves contacting zone 3 through line 5 and is condensed in condenser 6. The hydrocarbon liquid then passes through line 7 into contacting zone 8 which contains preferably a 10X or 13X molecular sieve. The temperature in this stage is from about 0 to 200° F., preferably from 70° to 150° F. This second adsorption step in the liquid phase removes substantially all of the olefins, and the feed, now stripped substantially of all contaminants, passes to e.g. an isomerization zone through line 9. The flow of feed to the contacting zones is discontinued just before breakthrough, i.e. the time when the respective contaminants are no longer adsorbed. The occurrence of breakthrough may be anticipated by observing the refractive index or ultraviolet absorption of the effluent stream. Breakthrough may also be established from temperature measurements within the bed. Bromine consumption is used to measure olefin breakthrough. The saturated molecular sieve may then be purged by use of an inert gas or hydrocarbons free of benzene, olefins and sulfur at a high temperature, i.e. on the order of 650° F. After purging, the sieve may be cooled and prepared for a subsequent adsorption step. In both adsorption stages pressures of from about 0 to 100 p.s.i.a. may be used; however, pressures from about 15 to 50 p.s.i.a. are preferred. Feed rates to the stages may vary from 0.1 to 10.0 w./w./hr., preferably from about 0.5 to 5.0 w./w./hr. Of course, the feed rates to and pressure in the two stages may differ.

A wide variety of molecular sieves may be employed in this invention. Those having a uniform pore size of from 6 to 15 angstroms are applicable. Naturally the pore size must be large enough to admit the impurities. A sodium and a sodium-calcium sieve, known as the Linde 13X and 10X respectively may be employed. These sieves are described in U.S. 2,882,244.

The sodium-calcium sieve is superior to the sodium sieve in heat stability. The following table compares the capacities of the two types of sieve for benzene after heating in wet air containing 10% water at 1300° F. for varying periods of time.

TABLE I

| Type of Sieve | Benzene Capacity at Equilibrium, Wt. percent | |
| --- | --- | --- |
| | Na—Ca | Na |
| Time, Hrs. at 1,300° F.: | | |
| 0 | 15.5 | 14.7 |
| 3 | 14.5 | 7.3 |
| 65 | 14.0 | 3.0 |

It should be understood that this invention is not limited to the use of the above sieves. Sieves with magnesium, barium, potassium, lithium, etc. as the cation are also within the scope of the invention. The molecular sieves used in this invention may be defined by the general formula:

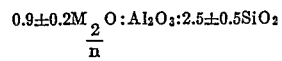

where "M" represents a cation, examples of which are given above and "$n$" represents its valence.

The following examples further illustrate the advantages of the invention.

*Example I*

In order to illustrate the advantages of the vapor-liquid phase absorption, the one-stage processes were compared with the two-stage process of the invention.

An aramco $C_5/C_6$ virgin naphtha feed was used in the experiments. It contained the following impurities.

TABLE II

| Impurity: | Wt. percent |
| --- | --- |
| Benzene | 2.2 |
| Olefins | 0.2 |
| Sulfur | 0.026 |

The work was done in an isothermal 400 gram unit. Adsorption was carried out in vapor phase and liquid phase alone. Linde 10X and 13X molecular sieve 1/16 inch pellets were used. (Throughout this case 10X refers to a sodium-calcium sieve and 13X to a sodium sieve.) In the first run vapor-phase adsorption was utilized at a temperature of 280° F. A 13X sieve was used. FIGURE II shows the benzene, sulfur and olefin content of the sievate product plotted against the weight of feed passing over the sieve. In a second run the same temperature conditions were used with a 10X sieve. FIGURE III illustrates the olefin content of sievate vs. the amount of feed passed through the sieve with the 10X sieve. The benzene and sulfur removal were essentially the same as shown in FIGURE II. These two vapor-phase runs show that, while benzene and sulfur removal is adequate, olefin removal is good for only a short period. In the case of 13X sieves olefin breakthrough occurred almost immediately after the start of adsorption. The 10X sieve, though slightly better, still only removed olefins for a brief period, i.e., until 1.2 w./w. of feed passed through the sieve—this is still well short of the benzene and sulfur breakthrough.

*Example II*

In this example a single liquid-phase operation was performed with a 10X sieve. The same equipment and sieve pellets as in the previous example were used. Benzene, sulfur and olefin content vs. the feed is clearly shown in FIGURE IV. The operation was carried out at 80° F. Though olefin removal is better in the liquid phase, this scheme is undersirable because the modest capacity of the sieve requires frequent desorption. This desorption, as mentioned previously in the case of liquid-phase operation, is very difficult, mainly because of the necessity of draining the sieve case prior to the vapor phase desorption.

*Example III*

In accordance with this invention, the following describes the two-stage adsorption. In this case, sulfur and benzene were removed in the vapor stage, and remaining olefins in the second liquid-phase stage. Sievate from Example I the conventional vapor-phase adsorption which contains 0.13% olefins, 0.0005% sulfur and less than 0.04% benzene was fed to a liquid-phase stage at 80° F. FIGURE V indicates the instantaneous and composite (cumulative) olefin content vs. the feed using the 10X sieve. The same conditions were used as in Example II.

FIGURE VI shows the data obtained after the second stage liquid-phase adsorption with a 13X sieve. In this stage the absorption zone was maintained at a temperature of 115° F. and a pressure of 10 p.s.i.g. The feed to this stage contained 0.17 wt. percent olefins 0.0005 wt. percent sulfur and approximately 0.005 wt. percent benzene. After 3.9 w./w. the composite sievate contained 0.034 percent olefins.

It will be noted that olefin removal with the 10X was essentially complete up to breakthrough which occurred at about 6.0 w./w. of feed. This capacity is twice that obtained in one liquid-phase stage and five times that obtained in the one vapor-phase stage. For an average concentration of 0.02% olefins in the effluent, 11.6 w./w. of feed could be processed per cycle. This means that the second stage could operate on a very long cycle compared with single-stage operation.

In the case of the two-stage operation using the 13X sieve the olefin content was again considerably reduced. However, this operation is less satisfactory than that employing the 10X.

Hence, in conclusion, it should be noted the two-stage operation gives a much higher capacity to both stages, requiring a considerably lesser number of cycles to process a given amount of feed. Also by using the two-stage process, all three components, i.e. benzene, sulfur and olefins, are substantially completely removed from the process stream.

The recited examples are merely illustrative of the invention and are not intended to define its scope.

What is claimed is:

1. A process for removing benzene, sulfur and olefins from a hydrocarbon feed stream which comprises vaporizing said feed stream, passing said vapor to a first adsorption zone containing a zeolitic molecular sieve of uniform pore size 6 to 15 angstroms, absorbing said benzene and sulfur, withdrawing an olefin-containing vapor substantially free of benzene and sulfur from said first adsorption zone, condensing said vapor, passing said condensate to a second adsorption zone containing a second zeolitic molecular sieve of uniform pore size 6 to 15 angstroms, maintaining a liquid phase in said second adsorption zone, adsorbing said olefins and withdrawing said condensate from said second adsorption zone substantially free of said benzene, sulfur, and olefins.

2. The process of claim 1 wherein the said feed stream is introduced into said first and second adsorption zones at rates of from about 0.1 to 10.0 w./w./hr., maintaining said first and second adsorption zones under pressures of from about 0 to 100 p.s.i.a., maintaining said first adsorption zone at a temperature of from about 150 to 500° F., and maintaining said second adsorption zone at a temperature of from about 0 to 200° F.

3. The process of claim 1 wherein the said feed stream is introduced into said first and second adsorption zones at rates of from about 0.5 to 5.0 w./w./hr., maintaining said first and second adsorption zones under pressures of from about 15 to 50 p.s.i.a., maintaining said first adsorption zone at a temperature of from about 200° to 350° F., and maintaining said second adsorption zone at a temperature from about 70 to 150° F.

4. The process of claim 1 wherein said zeolitic molecular sieve of uniform pore size is defined by the formula:

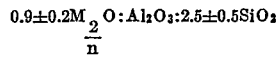

wherein "M" represents a cation and "n" represents the valence of said cation.

5. The process of claim 4 wherein said "M" is a sodium ion.

6. The process of claim 5 wherein said sodium ion is at least in part replaced by a calcium ion.

7. The process of claim 4 wherein said "M" is a magnesium ion.

8. The process of claim 1 wherein the said zeolitic molecular sieve in said second adsorption zone is a sodium-calcium molecular sieve.

9. A process for preparing a feed for an isomerization reaction which comprises vaporizing said feed, passing the vaporized feed containing benzene, sulfur and olefins to a first adsorption zone containing a zeolitic molecular sieve of uniform pore size of from 6 to 15 angstroms at a rate of from about 0.1 to 10 w./w./hr., maintaining said adsorption zone at a temperature of from about 150° to about 500° F. and under a pressure from about 0 to 100 p.s.i.a., desorbing said benzene and sulfur in said first adsorption zone, withdrawing from said first adsorption zone said feed substantially free of benzene and sulfur, condensing said feed, passing said feed to a second adsorption column containing a zeolitic molecular sieve of a uniform pore size of from 6 to 15 angstroms at a rate of from about 0.1 to 10.0 w./w./hr., maintaining a liquid phase operation, a temperature of from about 0 to 200° F. and a pressure of from about 0 to 100 p.s.i.a. in said second adsorption zone, withdrawing said feed from said second adsorption zone and then passing said feed to an isomerization reactor.

10. The process for preparing the feed for an isomerization reaction which comprises vaporizing said feed, passing the vaporized feed containing benzene, sulfur and olefins to a first adsorption zone containing a zeolitic molecular sieve of uniform pore size from 6–15 Angstroms at a rate of from about 0.5 to 5.0 w./w./hr., maintaining said adsorption zone at a temperature of from about 200 to about 350° F. and under a pressure from about 15 to 50 p.s.i.a., desorbing benzene and sulfur in said first adsorption zone, withdrawing from said first adsorption zone said feed substantially free of benzene and sulfur, condensing said feed, passing said feed to a second adsorption column containing a sodium-calcium zeolitic molecular sieve of a uniform pore size of from 6–15 Angstroms at a rate of from about 0.5 to 5.0 w./w./hr., maintaining a liquid phase operation at a temperature of from about 70–150° F. and a pressure of from about 15 to 50 p.s.i.a. in said second adsorption zone, withdrawing said feed from second adsorption zone, and then passing said feed to an isomerization reactor.

References Cited in the file of this patent

UNITED STATES PATENTS 2,909,582     Bleich et al. _____ Oct. 20, 1959
2,950,336     Kimberlin et al. _____ Aug. 23, 1960

FOREIGN PATENTS 812,680     Great Britain _____ Apr. 29, 1959